US009829169B2

(12) United States Patent
Madelaine et al.

(10) Patent No.: US 9,829,169 B2
(45) Date of Patent: Nov. 28, 2017

(54) PIVOTING MOUNTING OF A LIGHTING MODULE FOR MOTOR VEHICLES

(71) Applicant: Valeo Vision, Bobigny (FR)

(72) Inventors: Mehdi Madelaine, Maze (FR); Eric Chatel, Montreuil Juigne (FR)

(73) Assignee: Valeo Vision, Bobigny (FR)

( * ) Notice: Subject to any disclaimer, the term of this patent is extended or adjusted under 35 U.S.C. 154(b) by 196 days.

(21) Appl. No.: 14/749,784

(22) Filed: Jun. 25, 2015

(65) Prior Publication Data

US 2015/0377443 A1    Dec. 31, 2015

(30) Foreign Application Priority Data

Jun. 30, 2014   (FR) ..................................... 14 56199

(51) Int. Cl.
*B60Q 1/068* (2006.01)
*F21S 8/10* (2006.01)
*B60Q 1/076* (2006.01)

(52) U.S. Cl.
CPC .......... *F21S 48/1742* (2013.01); *B60Q 1/076* (2013.01); *F21S 48/1159* (2013.01); *F21S 48/1747* (2013.01); *F21S 48/321* (2013.01); *F21S 48/328* (2013.01)

(58) Field of Classification Search
CPC ... B60C 1/076; F21S 48/1159; F21S 48/1742; F21S 48/1747; F21S 48/321; F21S 48/328
See application file for complete search history.

(56) References Cited

U.S. PATENT DOCUMENTS

| 7,481,561 | B2 | 1/2009 | Okuda |
| 7,618,174 | B2 | 11/2009 | Yasuda et al. |
| 7,621,664 | B2 | 11/2009 | Nicolai |
| 8,277,099 | B2 * | 10/2012 | Hamashima ........... B60Q 1/068 362/528 |
| 8,523,416 | B2 | 9/2013 | Ohmi et al. |
| 8,585,265 | B2 | 11/2013 | Shibata et al. |
| 8,801,251 | B2 | 8/2014 | Ohmi et al. |
| 9,310,042 | B2 * | 4/2016 | Nomura ............... F21S 48/1742 |
| 9,381,849 | B2 * | 7/2016 | Shibata .................. B60Q 1/076 |
| 9,593,821 | B2 * | 3/2017 | Thullier .............. F21S 48/1216 |
| 2007/0076422 | A1 | 4/2007 | Nicolai |
| 2008/0144329 | A1 | 6/2008 | Okuda |
| 2009/0034279 | A1 | 2/2009 | Blandin et al. |
| 2012/0007506 | A1 | 1/2012 | Ohmi et al. |
| 2013/0314934 | A1 | 11/2013 | Ohmi et al. |

(Continued)

FOREIGN PATENT DOCUMENTS

DE    102008061526 A1    6/2010
DE    102010060642 A1    5/2012

(Continued)

*Primary Examiner* — Peggy Neils
(74) *Attorney, Agent, or Firm* — Jacox, Meckstroth & Jenkins

(57) ABSTRACT

The present invention concerns a lighting and/or signalling device including at least one lighting and/or signalling module. The module including at least one light source, a heatsink thermally coupled to the light source or sources to cool it or them, and optical means adapted to deflect the light rays from the light source or sources to form a light beam along an optical axis of the module. The module is pivotably mounted on a support of the device via its heatsink.

12 Claims, 2 Drawing Sheets

(56) References Cited

U.S. PATENT DOCUMENTS

2014/0112011 A1   4/2014  Nomura et al.
2014/0153274 A1   6/2014  Shibata et al.

FOREIGN PATENT DOCUMENTS

| EP | 1770328    | A1 | 4/2007 |
| EP | 2020336    | A1 | 2/2009 |
| EP | 2578451    | A1 | 4/2013 |
| EP | 2740991    | A2 | 6/2014 |
| FR | 2920516    | A1 | 3/2009 |
| JP | 2008047385 | A  | 2/2008 |
| WO | 2012098142 | A1 | 7/2012 |

* cited by examiner

PIVOTING MOUNTING OF A LIGHTING MODULE FOR MOTOR VEHICLES

CROSS-REFERENCE TO RELATED APPLICATIONS

This application claims priority to the French application 1456199 filed on Jun. 30, 2014, which application is incorporated herein by reference and made a part hereof.

BACKGROUND OF THE INVENTION

1. Field of the Invention

The invention relates to the field of lighting and/or signalling lights, notably for motor vehicles. The invention relates more particularly to a lighting and/or signalling lighting device including at least one lighting and/or signalling module the position of which can be adjusted relative to a support of the device.

2. Description of the Related Art

U.S. Pat. No. 7,618,174 B2 describes a motor vehicle headlamp including three lighting modules mounted to pivot vertically on a common support. These pivoting movements are coordinated and controlled by an electric motor, notably one slaved to the turning angle of the steering wheel of the vehicle in order to provide a directional lighting function, commonly known by the abbreviation DBL signifying "dynamic bending light". The light source of each of the modules and its heatsink are fixed relative to the support while for its part the optical part can pivot. This construction is beneficial in that it makes it possible to dispose the heatsinks of the light sources, notably of the light-emitting diode type, outside the housing of the device, thereby favoring the cooling of the light sources. However, it has the disadvantage that an operating clearance must be provided between the reflectors and the corresponding light sources. This clearance can give rise to certain problems, notably loss of light. Moreover, the lighting beams from the modules cannot be adjusted vertically relative to one another.

U.S. Pat. No. 8,585,265 B2 describes a motor vehicle headlamp including at least one lighting module the beam from which is adjustable vertically and horizontally. The light source, the heatsink for cooling the source in question and a reflector cooperating with the source are mounted fixedly on a support. A lens adapted to deflect the light rays emitted by the source and reflected by the reflector is mounted to pivot about a vertical axis and about a horizontal axis. It is mounted in such a way that the focus of the lens coincides at all times with a corresponding focus of the combination of the reflector and the light source. This construction is beneficial in that, just as in the teaching of the previous document, it makes it possible to provide optimum cooling of the light source or sources. It can also alleviate the problem of the movement of the reflector relative to the light sources that is a feature of the teaching of the previous document. However, it has the disadvantage of imposing certain constraints at the level of the architecture of the headlamp. In fact, the heatsinks must necessarily be situated at the rear and, to be able to implement the teaching of this document, the module must include a lens. Moreover, the construction in accordance with this teaching is somewhat complex and potentially costly.

An objective of the invention is to alleviate at least one of the disadvantages of the prior art, more particularly of the prior art mentioned above. A more particular objective of the invention is to propose a lighting and/or signalling device including a pivoting module that is simpler and/or more economic to fit.

SUMMARY OF THE INVENTION

The invention consists in a lighting and/or signalling device for motor vehicles, including: at least one lighting module adapted to emit a light beam and including a heatsink and a support noteworthy in that the at least one lighting module is mounted to pivot on the support via its heatsink.

In accordance with one advantageous embodiment of the invention, the at least one lighting module has an optical axis and pivots about an axis transverse, preferably perpendicular, to the optical axis of the module.

In accordance with one advantageous embodiment of the invention, the support includes a cradle on which the heatsink of the at least one lighting module is pivotably mounted, the cradle preferably being made of electrically insulative material. The cradle may be made of material, notably thermoplastic material.

In accordance with one advantageous embodiment of the invention, the cradle forms two arms extending laterally on either side of the heatsink.

In accordance with one advantageous embodiment of the invention, the heatsink of the at least one lighting module includes laterally, on each side, a trunnion cooperating with one of the arms.

In accordance with one advantageous embodiment of the invention, at least one, notably each, of the two arms includes surfaces for guiding the corresponding trunnion of the heatsink to position the at least one lighting module relative to the cradle, preferably by clipping.

In accordance with one advantageous embodiment of the invention, the guide surfaces converge towards a final housing of the trunnion, preferably in a longitudinal direction.

In accordance with one advantageous embodiment of the invention, the guide surfaces are configured to deform elastically at least a portion of the arms in a transverse direction away from the module when fitting the module, the portions of the arms executing a reverse movement when the module reaches a final position.

In accordance with one advantageous embodiment of the invention, the at least one lighting module includes means for lateral retention of the arms relative to the module.

In accordance with one advantageous embodiment of the invention, the at least one lighting module includes a mask including the lateral retaining means, the means preferably forming surfaces for retaining the arms on the mask. The mask may be adapted to be fitted to the module after fitting the module to the cradle.

In accordance with one advantageous embodiment of the invention, the mask includes an aesthetic portion intended at least to mask the heatsink, the lateral retaining means extending on either side of the mask from the aesthetic portion parallel to the arms of the cradle.

In accordance with one advantageous embodiment of the invention, each of the lateral retaining means extends so as to cover the arm that these means are intended to retain.

In accordance with one advantageous embodiment of the invention, the lateral regaining means are in the form of lugs.

In accordance with one advantageous embodiment of the invention, the cradle includes a base connecting the two arms, the base comprising means for positioning and fixing it on a plate, preferably a metal plate, of the support.

In accordance with one advantageous embodiment of the invention, the heatsink forms the lower portion of the at least one lighting module, the heatsink preferably extending longitudinally over more than 50%, more preferably over more than 70%, of the length of the module.

In accordance with one advantageous embodiment of the invention, the device includes one or more shoes disposed between a lower face of the heatsink of the module or each module and the plate, the shoe or shoes being configured to damp vibrational movements of the module relative to the plate.

In accordance with one advantageous embodiment of the invention, the at least one lighting module includes at least one light source thermally coupled to the heatsink of the module. The light source or sources may be mounted directly on the heatsink and so the latter may be at the electrical potential of one of the power supply conductors of the sources.

In accordance with one advantageous embodiment of the invention, the at least one lighting module including a light source includes optical means adapted to deflect the light rays from the light source or sources to form a light beam along an optical axis of the module.

In accordance with one advantageous embodiment of the invention, the at least one lighting module including at least one light source and optical means for forming a light beam, the light source or sources, the heatsink and the optical means of the or each module form a rigid assembly adapted to pivot relative to the support.

In accordance with one advantageous embodiment of the invention, there are at least two modules and they are lighting modules, a first of the modules being mounted in non-pivotable manner on the support, at least a second one of the modules being pivotably mounted. The support may be a common support for the modules. In other words, the support is the same part, made of aluminum or magnesium, for example. This feature offers the advantage of making it possible to reduce the weight of the device.

In accordance with one advantageous embodiment of the invention, the first module being adapted to produce a first beam, notably with a cut-off on the right-hand side or no cut-off, the second module being adapted to produce a second light beam, notably with a cut-off with an offset, the device is capable of producing a lighting function, notably of high beam or low beam type, by superposition of the first and second beams.

In accordance with one advantageous embodiment of the invention, the device further includes a module for adjusting the second module to adjust the direction of emission of the second light beam.

The features of the invention are beneficial in that they make it possible to provide a pivoting mounting simply and economically. In fact, they make it possible to pivot the whole of the module, which can remain of monobloc construction. The construction of the module remains simple and classic; its reliability is therefore controlled. Placing the heatsink at the bottom of the module and so that it extends longitudinally over most of the module makes it possible to lower the center of gravity of the module and thereby improve its stability. Moreover, the use of the cradle is particularly simple and economical. This also facilitates mounting the module on the cradle.

Other features and advantages of the present invention will be better understood with the aid of the following description, the accompanying drawings and the appended claims.

BRIEF DESCRIPTION OF THE ACCOMPANYING DRAWINGS

DETAILED DESCRIPTION OF THE PREFERRED EMBODIMENTS

Figure 1:
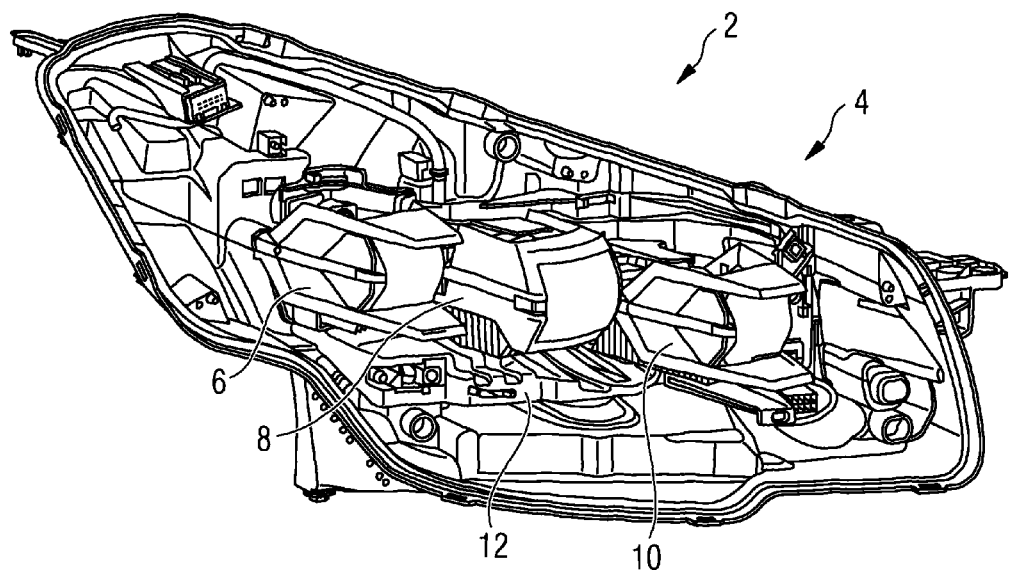
FIG. 1 is a general view of a motor vehicle headlamp conforming to the invention.

FIG. 1 shows a lighting device, to be more precise a motor vehicle headlamp 2. The headlamp 2 is shown in perspective from in front and from the right. Here it is a right-hand headlamp, represented without the outer lens closing the housing 4. The latter accommodates three lighting modules 6, 8, 10. These three modules 6, 8, 10 provide the high beam and low beam type lighting functions. The low beam type lighting function corresponds to essentially horizontal lighting with a cut-off intended for passing other vehicles if the high beam type lighting function has no cut-off and illuminates higher and therefore farther, this function being reserved for driving without passing other vehicles.

Of these three modules 6, 8, 10, a first module is able to produce a lighting beam with a right-hand and horizontal cut-off, a second module is able to produce a lighting beam with a horizontal cut-off with an offset and the third module is able to produce a lighting beam with no cut-off. The low beam type lighting function can then be provided by the first and second modules in combination. Similarly, the high beam type lighting function can be provided by the first and third modules in combination. The lighting functions are therefore provided by superposing two beams.

The three modules 6, 8, 10 are mounted on a support 12 that is preferably common to the three modules 6, 8, 10. For the superposition of the beams from the different modules 6, 8, 10 to be satisfactory, it may be necessary to adjust the beams relative to one another, notably vertically. To this end, at least one of the modules 6, 8, 10, preferably at least two of the modules 6, 8, 10 when there are three of them, may be mounted to pivot about a generally horizontal axis in order to be able to adjust the beam in a vertical direction.

The mounting of the module 6 on its support 12 is described with reference to FIGS. 2-4, on the understanding that this form of mounting is equally applicable to each of the other modules 8, 10.

Figure 2:
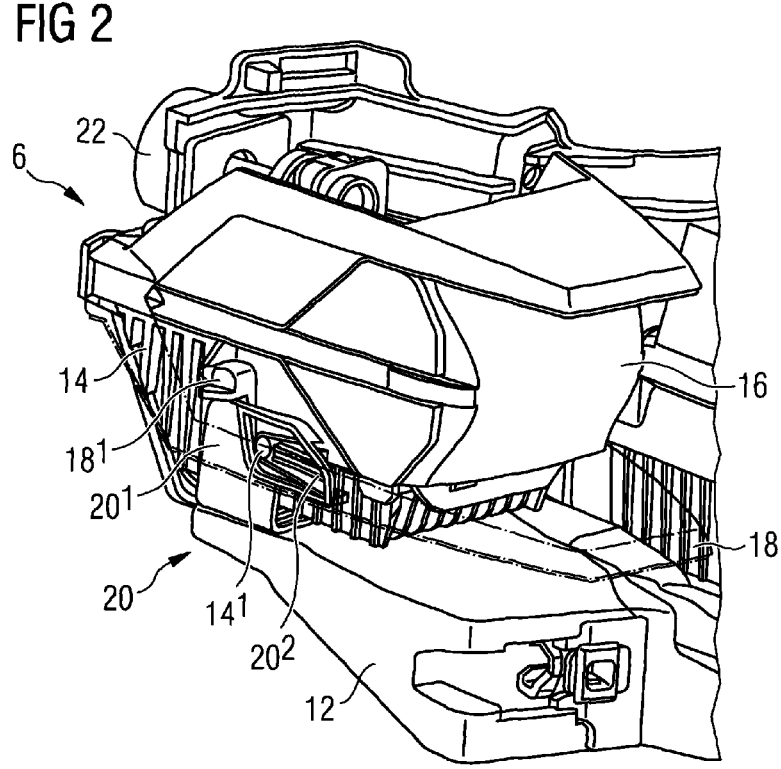
FIG. 2 is a detail view of a lighting module of the FIG. 1 headlamp.

FIG. 2 is a detail view of the lighting module 6. It includes a heatsink 14, also known as a heat dissipater, supporting one or more light sources (not visible). It also includes optical means adapted to reflect and/or to deflect the rays produced by the light source or sources in order to form a lighting beam. The optical means may include a reflector (not visible) and a lens 16. These various components are well known in themselves to a person skilled in the art. These various components of the lighting module 6 form a rigid assembly mounted to pivot on the support 12 via the cradle 20.

The heatsink 14 extends longitudinally under the lighting module 6 and includes two trunnions $14^1$ cooperating through rotary engagement with arms $20^1$ of the cradle 20. These arms $20^1$ may further include guide surfaces $20^2$ intended to facilitate fitting the lighting module 6, more particularly fitting the trunnions $14^1$ of the heatsink 14 in their respective housings in the arms $20^1$. The guide surfaces $20^2$ are in fact directed so as to diverge towards the front of the lighting module 6 and the headlamp 2, thus enabling the lighting module 6 to be fitted by a movement for the most part longitudinal towards the rear.

The cradle 20 is preferably made from an electrically insulative material, such as in particular a plastic material. The heatsink 14 is made from a thermally conductive material, notably a metal, such as aluminum, for example. The at least one light source is preferably of the light-emitting diode type. Such light sources require cooling, which is provided by the heatsink 14. The light sources can therefore be mounted directly on the heatsink 14 in order to maximize the transfer of heat. To this end, the light source or sources may be mounted directly on the heatsink 14, and so the latter may be at the electrical potential of one of the power supply conductors of the sources.

It may therefore be necessary to insulate the heatsink 14 electrically from the rest of the headlamp 2, more particularly the support 12. The latter may in fact be made of metal, more particularly of sheet metal for reasons essentially of cost and stiffness.

The lighting module 6 may also include a part 18 serving not only as a shield but also to retain the arms $20^1$ of the cradle 20 via its portions $18^1$. In fact, when placing the lighting module 6 on the support 12 via the guide surfaces $20^2$, the arms $20^1$ of the cradle 20 are elastically deformed so as to move away from the heatsink 14, in an essentially transverse direction, thereafter to return to a position close to the initial position when the trunnions $14^1$ are engaged in the corresponding housings in the arms $20^1$. To prevent any untimely spreading apart of the arms $20^1$, the part 18 may be fitted to the lighting module 6 after fitting the lighting module 6 to the cradle 20, the part 18 including laterally on either side of the heatsink 14 of the lighting module 6 a portion $18^1$ forming a retaining lug. This lug extends parallel to an upper portion of an arm $20^1$ and externally of the portion. The part 18 is represented by virtue of transparency in FIG. 2.

A device 22 is provided for adjusting the lighting module 6 relative to the support 12. It may electrical or mechanical. It may include a mobile part mechanically connected to a portion of the lighting module 6 at a distance from the pivot axis defined by the trunnions $14^1$ and the cradle 20. This mechanical connection may be a ball-joint connection. The movement of the mobile part therefore makes it possible to modify the inclination of the lighting module 6 relative to its pivot axis.

The range of pivoting of the lighting module 6 is limited, for example to less than 20°, preferably less than 15°, more preferably less than 10°. Means for damping the pivoting movement may be provided between the heat sink 14 and the support 12. To be more specific, one or more shoes (not shown) may be provided between the lower face of the heatsink and the support 12, the shoe or shoes being made from an elastically deformable material with a damping component, such as an elastomer and/or fibrous material, for example.

Figure 3:
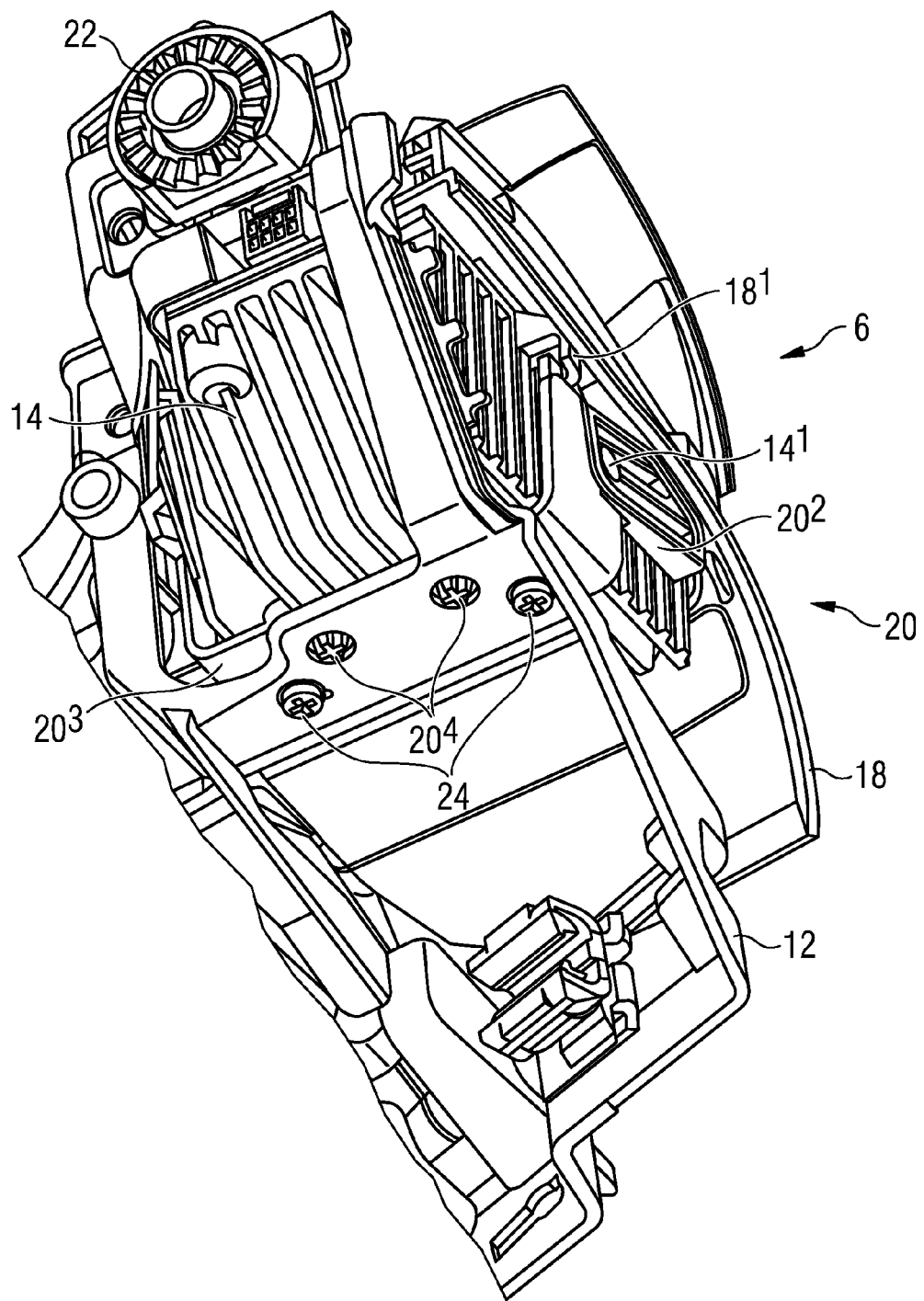
FIG. 3 is a perspective view from behind and from below of the FIG. 2 module.

FIG. 3 is a detail perspective view of the lighting module 6 from behind and below the lighting module 6. It can be seen that the cradle 20 includes a base $20^3$, the base $20^3$ and the arms $20^1$ having a U-shaped profile adapted to receive the lighting module 6, to be more precise the heatsink 14 of the lighting module 6. The base $20^3$ may include centering pins $20^4$ cooperating by engagement with corresponding orifices in a plate of the support 12. In a similar way, fixing means such as fixing screws may be used to fix the base $20^3$ to the plate of the support 12. These fixing means cooperate with orifices in the base $20^3$ of the cradle 20 and in the plate of the support 12.

The portions $18^1$ of the part 18 can be seen in FIG. 3. The portions $18^1$ more precisely form notches with which projecting portions of the arms $20^1$ of the cradle 20 cooperate. These notches are open towards the rear of the lighting module 6 to enable their placement via the part 18 in a longitudinal rearward direction.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting and/or signalling device for motor vehicles comprising:
   at least one lighting module adapted to emit a light beam and including a heatsink; and
   a support;
   wherein said at least one lighting module is mounted to pivot on said support via said heatsink;
   wherein said support includes a cradle on which said heatsink of said at least one lighting module is pivotably mounted, said cradle being made of electrically insulative material;
   wherein said cradle forms two arms extending laterally on either side of said heatsink;
   wherein said heatsink of said at least one lighting module includes laterally, on each side, a trunnion cooperating with one of said arms;
   wherein at least one, notably each, of said two arms includes surfaces for guiding said corresponding trunnion of said heatsink relative to said cradle to fit said at least one lighting module;
   wherein said at least one lighting module has lateral retaining means of said arms relative to said at least one lighting module;
   wherein said at least one lighting module includes a mask including said lateral retaining means, said means forming surfaces for retaining said arms on said mask.

2. The lighting and/or signalling device according to claim 1, wherein said at least one lighting module has an optical axis and pivots about an axis transverse to said optical axis of said at least one lighting module.

3. The lighting and/or signalling device according to claim 1, wherein said mask includes an aesthetic portion intended at least to mask said heatsink, said lateral retaining means extending on either side of said mask from the aesthetic portion parallel to said arms of said cradle.

4. The lighting and/or signalling device according to claim 1, wherein each of said lateral retaining means extends so as to cover said arm that said retaining means are intended to retain.

5. The lighting and/or signalling device according to claim 1, wherein said cradle includes a base connecting said two arms, said base including positioning means for positioning it on or fixing means for fixing it to said support.

6. The lighting and/or signalling device according to claim 1, wherein said at least one lighting module includes at least one light source thermally coupled to said heatsink of said module.

7. The lighting and/or signalling device according to claim 6, wherein said at least one lighting module including said at least one light source includes optical means adapted to deflect the light rays from said at least one light source to form a light beam along an optical axis of said at least one lighting module.

8. The lighting and/or signalling device according to claim 1, wherein said at least one lighting module including said least one light source and optical means for forming said light beam, said at least one light source, said heatsink and said optical means of said at least one lighting module form a rigid assembly adapted to pivot relative to said support.

9. The lighting and/or signalling device according to claim 2, wherein said support includes a cradle on which said heatsink of said at least one lighting module is pivotably mounted, said cradle being made of electrically insulative material.

10. The lighting and/or signalling device according to claim 5, wherein said fixing means fixes said base to a plate of said support.

11. A lighting and/or signalling device for motor vehicles comprising:
- at least one lighting module adapted to emit a light beam and including a heatsink; and
- a support;
- wherein said at least one lighting module is mounted to pivot on said support via said heatsink;
- wherein said support includes a cradle on which said heatsink of said at least one lighting module is pivotably mounted, said cradle being made of electrically insulative material;
- wherein said cradle forms two arms extending laterally on either side of said heatsink;
- wherein said heatsink of said at least one lighting module includes laterally, on each side, a trunnion cooperating with one of said arms;
- wherein at least one, notably each, of said two arms includes surfaces for guiding said corresponding trunnion of said heatsink relative to said cradle to fit said at least one lighting module;
- wherein said at least one lighting module has lateral retaining means of said arms relative to said at least one lighting module;
- wherein there are at least two modules and they are lighting modules, a first of said modules being mounted in a non-pivotable manner on said support, at least a second one of said modules being mounted in a pivotable manner, said first module being adapted to produce a first beam with at least one of a right-hand cut-off or no cut-off, said second module being adapted to produce a second lighting beam with a cut-off and an offset, and in that said device is capable of producing a lighting function of a low beam type by superposition of said first and second beams.

12. A lighting and/or signalling device for motor vehicles comprising:
- at least one lighting module adapted to emit a light beam and including a heatsink; and
- a support;
- wherein said at least one lighting module is mounted to pivot on said support via said heatsink;
- wherein said support includes a cradle on which said heatsink of said at least one lighting module is pivotably mounted, said cradle being made of electrically insulative material;
- wherein said cradle forms two arms extending laterally on either side of said heatsink;
- wherein said heatsink of said at least one lighting module includes laterally, on each side, a trunnion cooperating with one of said arms;
- wherein at least one, notably each, of said two arms includes surfaces for guiding said corresponding trunnion of said heatsink relative to said cradle to fit said at least one lighting module;
- wherein said at least one lighting module has lateral retaining means of said arms relative to said at least one lighting module;
- wherein said at least one lighting module has an optical axis and pivots about an axis transverse to said optical axis of said at least one lighting module;
- wherein there are at least two modules and they are lighting modules, a first of said modules being mounted in a non-pivotable manner on said support, at least a second one of said modules being mounted in a pivotable manner, said first module being adapted to produce a first beam with at least one of a right-hand cut-off or no cut-off, said second module being adapted to produce a second lighting beam with a cut-off and an offset, and in that said device is capable of producing a lighting function of a low beam type by superposition of said first and second beams.

\* \* \* \* \*